United States Patent
Marchessault et al.

(10) Patent No.: US 6,534,599 B2
(45) Date of Patent: Mar. 18, 2003

(54) MACROMERS OF POLY (HYDROXYALKANOATES)

(75) Inventors: Robert H. Marchessault, Montreal (CA); Sophie Nguyen, Montreal (CA); Ga-Er Yu, Montreal (CA)

(73) Assignee: McGill University, Montreal (CA)

( * ) Notice: Subject to any disclaimer, the term of this patent is extended or adjusted under 35 U.S.C. 154(b) by 0 days.

(21) Appl. No.: 09/929,073

(22) Filed: Aug. 15, 2001

(65) Prior Publication Data

US 2002/0042481 A1 Apr. 11, 2002

Related U.S. Application Data

(60) Provisional application No. 60/225,822, filed on Aug. 17, 2000.

(51) Int. Cl.$^7$ ................................. C08F 20/00

(52) U.S. Cl. ..................... 525/450; 525/451; 528/361

(58) Field of Search ............... 525/450, 451; 528/361

(56) References Cited

U.S. PATENT DOCUMENTS 5,760,144 A * 6/1998 Ozeki et al.
6,156,852 A * 12/2000 Asrar et al.

OTHER PUBLICATIONS

"Thermal Degradation of Microbial Copolyesters: Poly(3–hydroxybutyrate–co–hydroxyvalerate) and Poly(3–hydroxybutyrate–co–4–hydroxybutyrate)" by Masao Kunioka et al, 1990 American Chemical Society, pp. 89–92.
"The Thermal Degradation of Poly(–(D)–β–Hydroxybutyric Acid): Part 1–Identification and Quantitative Analysis of Products" by N. Grassie et al, Elsevier Applied Science Publishers, Ltd., England, 1984, pp. 47–61.
"The Thermal Degradation of Poly(–(D)–β–Hydroxybutyric Acid): Part 2–Changes in Molecular Weight" by N. Grassie et al, Elsevier Applied Science Publishers, Ltd., England, 1984, pp. 96–103.
"The Thermal Degradation of Poly(–(D)–β–Hydroxybutyric Acid): Part 3–The Reaction Mechanism" by N. Grassie et al, Elsevier Applied Science Publishers, Ltd., England, 1984, pp. 127–134.

* cited by examiner

Primary Examiner—James J. Seidleck
Assistant Examiner—Olga Asinovsky
(74) Attorney, Agent, or Firm—Ogilvy Renault

(57) ABSTRACT

The thermal degradation of the biodegradable bacterial polyesters poly(3-hydroxybutyrate), PHB, and poly(3-hydroxybutyrate-co-3-hydroxyvalerate), PHB/V produces a macromer, especially a 1000–6000 g/mol macromolecule, which contains an unsaturated end group as well as a carboxylic acid end group. The macromers may be polymerized to produce homopolymers and copolymers for different applications in which amphiphilic and biocompatible properties are required, for example, drug delivery systems.

16 Claims, 1 Drawing Sheet

MACROMERS OF POLY (HYDROXYALKANOATES)

This application claims the benefit under 35 U.S.C. §119(e) of Provisional Application Ser. No. 60/225,822, filed Aug. 17, 2000.

BACKGROUND OF INVENTION i) Field of the Invention

This invention relates to macromers derived from the thermal degradation of poly(3-hydroxybutyrate), poly(3-hydroxyvalerate) and poly(3-hydroxybutyrate-co-3-hydroxyvalerate); a process for their preparation, homopolymers and copolymers derived from the macromers the use of such homopolymers and copolymers to provide product having amphiphilic and biocompatible properties, for example, in drug delivery systems, polymer surfactants and biocompatible adjuvants.

ii) Description of Prior Art

Poly(3-hydroxybutyrate), PHB; poly(3-hydroxyvalerate), PHV; and poly(3-hydroxybutyrate-co-3-hydroxy-valerate), PHB/V, are aliphatic thermoplastic polyesters[1,2,3] of formulae Ia, Ib and Ic, respectively:

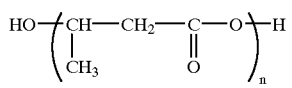

Ia.

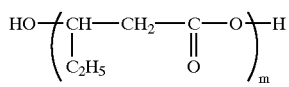

Ib.

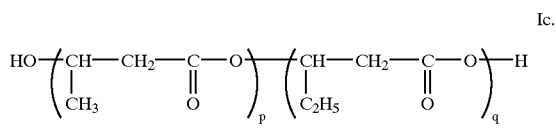

Ic.

Where n and m are integers indicating the number of repeat units, and p and q are mole % of each monomer randomly distributed [3]. Typically, n is an integer of 10 to 10,000,000, preferably 100 to 1,000,000; m is an integer of 10 to 200,000 preferably 60,000; p and q are each 0 to 100, and the summation p + q is 100.

PHB and PHB/V are poly(hydroxyalkanoates), PHAs, known as bacterial carbon and energy storage materials. They are biodegradable and biocompatible polymers produced by a large number of bacteria such as *Alcaligenes eutrophus*[3,4,5], now called *Ralstonia eutropha*. PHB is brittle, which reduces its potential industrial applications, but the incorporation of 3-hydroxyvalerate repeat units has been shown to improve flexibility in the resulting copolymer by reducing crystallinity[3,6]. PHB and PHB/V are crystalline polymers, with melting points ($T_m$) of ca. 180° C. for PHB and a range of 70 to ca 180° C. for the PHB/V copolymers[7,8].

PHB, PHV and PHB/V are β-polyesters, i.e. their β-carbons are substituted, which makes them thermally unstable at temperatures higher than their melting point[3].

SUMMARY OF THE INVENTION

It is an object of this invention to provide macromers derived from PHB, PHV and PHB/V, respectively.

It is a further object of this invention to provide a process for producing the aforementioned macromers.

It is another object of this invention to provide families of macromers which differ in end group functionality and/or in molecular weight.

It is still another object of this invention to provide macromers derived from the thermal degradation of poly(3-hydroxyalkanoate)s.

It is yet another object of this invention to provide homopolymers of the macromers.

It is still another object of this invention to provide copolymers of the macromers with one or more comonomers.

In accordance with one aspect of the invention, there is provided a macromer derived from thermal degradation of poly(3-hydroxybutyrate), poly(3-hydroxyvalerate), or poly(3-hydroxybutyrate-co-3-hydroxyvalerate). In accordance with another aspect of the invention, there is provided a process of producing a macromer comprising thermally degrading poly(3-hydroxybutyrate), poly(3-hydroxyvalerate), or poly(3-hydroxybutyrate-co-3-hydroxyvalerate).

In accordance with other aspects of the invention, there is provided a homopolymer of the macromer of the invention; a copolymer of the macromer of the invention and a comonomer; and a block copolymer of a macromer of the invention, and a block comonomer.

DETAILED DESCRIPTION OF INVENTION AND PREFERRED EMBODIMENTS i) Production of Macromers

The present invention focuses on macromers of PHB, PHV and PHB/V, which are macromolecules of small size or length, typically between 1000 and 6000 g/mol, and their preparation by thermal degradation at a constant temperature.

Suitably, the thermal degradation is carried out at a temperature of 180° C. to 220° C.

In particular embodiments, PHB and copolymers of PHB/V having up to 21 mol% of hydroxyvalerate were treated at two different temperatures, 190–192° C. and 200–202° C., for a reaction time of 3.5 hrs, and then fractionated. The products obtained were then characterized by proton nuclear magnetic resonance spectroscopy ($^1$H-NMR) and gel permeation chromatography (GPC). The copolymers were also degraded at 190+/–1° C. for reaction times of 3.5, 5, and 7 hrs, and the crude products were analysed by $^1$H-NMR and GPC. The homopolymers PHB and PHV were analyzed also by positive fast atom bombardment mass spectrometry (FAB$^+$-MS). The resulting macromers can be used as monomers for polymerization, for example, homopolymerization or copolymerization with one or more comonomers. Thermal degradation produces low molecular weight PHB and PHB/V containing one unsaturated end (Scheme 1). At moderately high temperatures, the reaction proceeds by a random scission cis-elimination mechanism having a six-membered ring ester intermediate[8,9,10], which is shown on Scheme 2.

Scheme 1
Thermal degradation scheme for PHB and PHB/V.

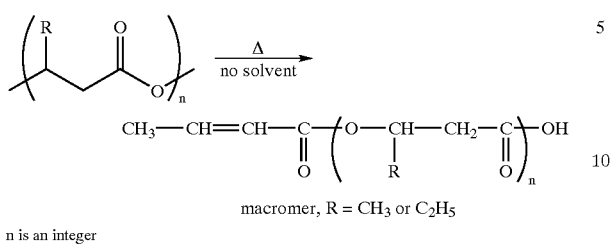

macromer, R = CH$_3$ or C$_2$H$_5$ n is an integer

Scheme 2
Thermal degradation mechanism, McLafferty rearrangements involving a six-membered ring transition state leading to β-eliminations.

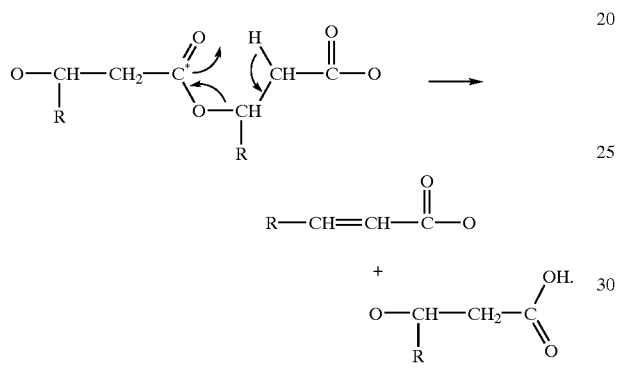

R = CH$_3$ or C$_2$H$_5$.

In Scheme 1, the methyl sidegroup can be replaced by ethyl; the integer n is 10 to 10,000,000, preferably 100 to 1,000,000 when the terminal sidegroup is methyl.

The scale-up experiments were performed at 201° C. (average value), 3 hours and gave similar results to lab-scale reactions.

ii) Macromers

Polymer architecture is controlled by a wide variety of catalysts and synthesis strategies. The use of macromers of the invention to make architectures involving PHB, PHV and PHB/V blocks is enabled by the availability of alpha and omega functionally terminated low molecular weight poly (3-hydroxyalkanoates). The structure of the PHB polyester may be represented as:

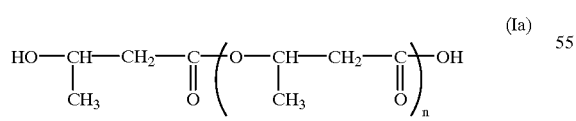
(Ia)

where n is an integer indicating the number of repeat units. Suitably n is 10 to 10,000,000, preferably 100 to 1,000,000.

Specifically, the macromer can be used to make block and comb-like polymers and other architectures with amphiphilic and biocompatible properties for applications such as drug delivery, polymer surfactant, biocompatible adjuvant. The following molecular models A to E show some of the PHB macromers which can be produced:

A

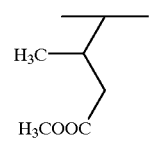

B

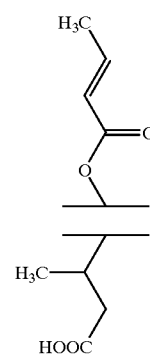

C

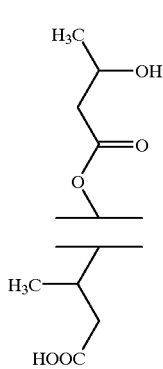

D

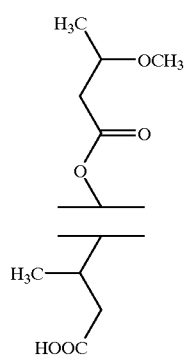

E

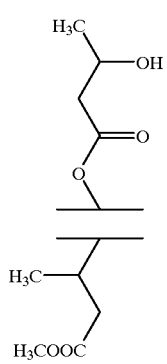

The models A to E may be generally represented by formula II:

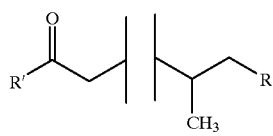

In formula II R' is a PHB macromer end group providing a carboxyl or carboxylate alpha end; and R provides a propenyl omega end (Models A and B) or a beta hydroxyl or methoxide end (Models C, D and E). The designation

in formula II identifies repeating continuity of the PHB as shown in II above.

Various controlled chemical chain scissions and end group reactions can be used to create the above models A to E, including alkaline and acid hydrolysis as well as pyrolysis. Under certain conditions the reactions lead to narrow molecular weight macromers with yields of 70–90%.

Typically the macromers of the invention have a number average molecular weight of 1,000 to 6,000 g/mol.

Polymerization of Macromers and Block Copolymer Formation

Two major ways of polymerization from the macromers are possible, using the β-alkyl acrylate end group, or the carboxylic acid end group.

Polymerization by the unsaturated end group:

The particularity of the olefin end group is the β-substitution with a methyl, and its predominantly trans configuration.

The following equation represents the formation of a comb polymer from the β-methylacrylate macromer below by chemical linkage of macromers via a polymerization reaction at the double bond end, in which R is methyl as shown in models A and B but may also be ethyl, in the case of macromers from PHB/V or PHV or other terminal moiety as shown in models C, D and E. $R^3$ is the appropriate alpha moiety, such as indicated for formula II in the case of PHB.

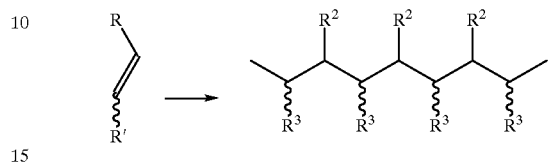

The Group Transfer polymerization may be employed to polymerize the macromers. Ute et al. reported the polymerization of trans-methylcrotonate 1 via this method, using 1-methoxy-1-(trimethylsiloxy)-2-methyl-1-propene 2 with catalytic amounts of $HgI_2$ and $(CH_3)_3SiI$ in $CH_2Cl_2$. [Ute et al. *Polymer Journal* 1997, 29, 11, 957–958, also 1999, 31, 2, 177–183].

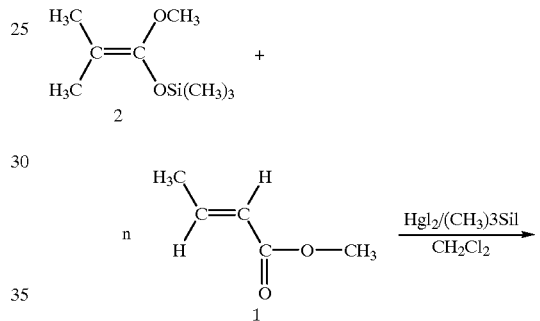

Polymerization by the carboxylic acid end group:

A possible approach involves the modification of the carboxylic acid end group to increase the reactivity of the macromers towards polymerization. The carboxylic acid ends could be reacted with 2-hydroxyethyl methacrylate (HEMA) to produce macromers with methacrylate-type ends on one side, via an esterification with, for example, 1.3-dicyclohexylcarbodiimide (DCC) and 4-(dimethylamino) pyridyne (DMAP), or by reaction of HEMA on the acyl

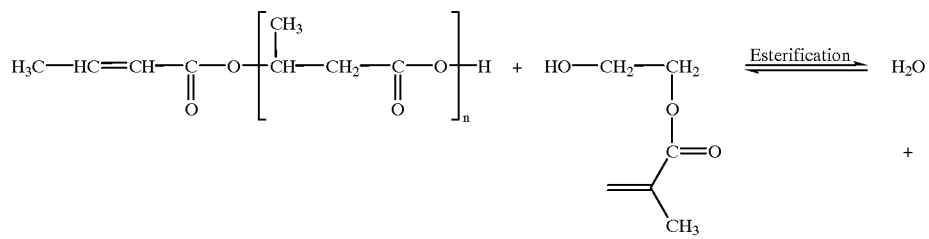

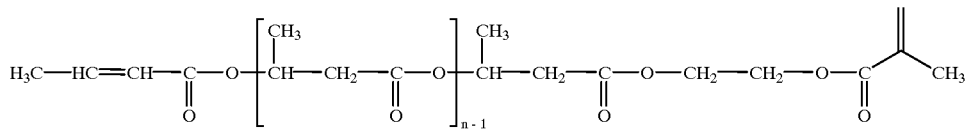

chloride of the macromers. The reaction scheme is the following:

As HEMA is well known to polymerize easily through free radical polymerization, the transformed macromers are expected to polymerize with free radicals. The polymerization scheme is shown below.

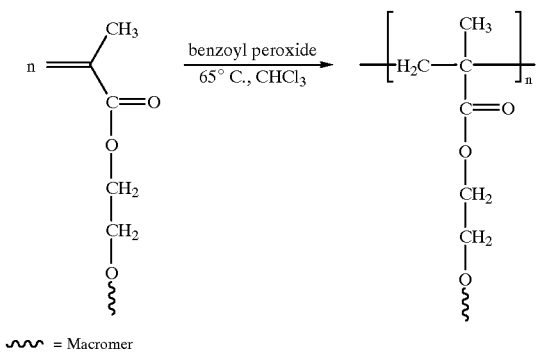

Copolymers of HEMA and the macromers may be obtained from the same method, by using both monomers, in a suitable solvent accommodating the hydrophilicity of poly(HEMA) and the hydrophobicity of the macromers of PHB.

A controlled free radical polymerization method, such as the atom transfer radical polymerization (ATRP) may be employed. A few examples of polymerization of HEMA by ATRP have been reported (Matyjaszewski et al. *Macromolecules* 1999, 32, 5772–5776, also Armes et al. *Macromolecules* 2001, 34, 3155–3158).

The preparation of block copolymers may be achieved by coupling the macromers with monomethoxy polyethylene glycol (PEG) employing the procedure of (R. H. Marchessault and G. E. Yu, Polymer Preprints p. 527 40, No 1, 1999), where the macromer was prepared by heterogeneous hydrolysis of PHB with methanolic sodium methoxide. As the comonomer or coblock for reaction with the macromers of the invention there may be employed those monomers or blocks which have a polymer chain with a functional end group which reacts with the COOH end group of the macromer, for example: amino, hydroxyl or isocyanate functional end groups. By way of example, the comonomer or coblock may be a polyethylene glycol moiety having a terminal amino, hydroxyl or isocyanate group. The amino groups, hydroxyl groups and isocyanate groups form amide, ester and urethane linkages respectively, on reaction with the carboxylic acid groups of the macromers.

By way of further example, amphiphilic block copolymers may be formed from macromers of the invention with propylene oxide and ethylene oxide in appropriate monomer ratios to produce a water soluble polymer. Similarly a ring carbohydrate such as a cycloamylose could be a suitable water soluble moiety.

In general, polymer size for homopolymer, copolymer or block copolymer product will be dictated by the preference for water solubility; the choice and proportions of comonomers and block comonomers will also be dictated by the preference for water solubility in the resulting polymer.

The carboxylic acid group in the macromers of the invention may also be grafted to soluble polymers or active surface containing accessible functional groups employing the techniques and procedures described in M. Yalpani et al, *Macromolecules* 24, 6046 (1991) and G. Yu et al, *Macromolecules* 32, 518 (1999) the teachings of which are incorporated herein by reference.

In general, comonomers for producing copolymers of the macromer of the invention include vinyl monomers, for example, acrylates. Block comonomer for producing block copolymers of the macromers of the invention include polyethylene glycol, polypropylene glycol, polyurethane and vinyl monomers including acrylates.

EXPERIMENTAL PROTOCOL

Materials

Figure 1:
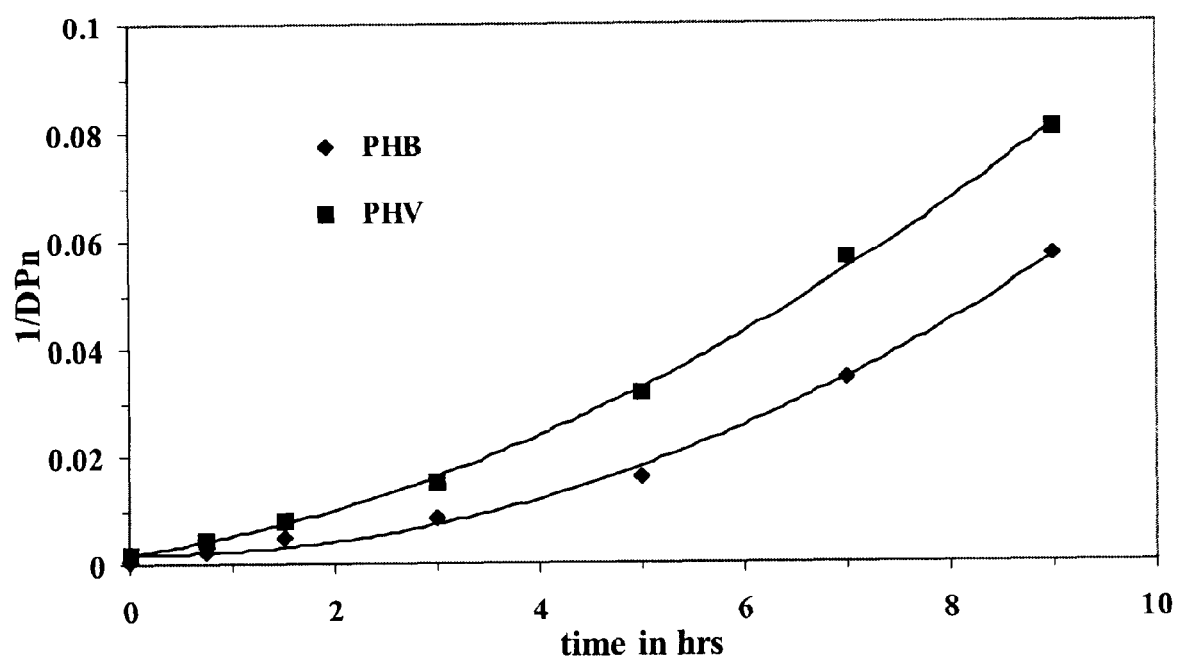
FIG. 1 demonstrates the trend of the number degree of polymerization ($DP_n$) reciprocal during formation of macromers from PHB and PHV. The $DP_n$ was calculated from GPC results.

Samples of PHB and PHB/V were obtained from ICI labeled as BIOPOL (Trademark). They were most probably solution-precipitated which encourages folded chain morphology.

Samples of PHV were obtained from Dr A. Steinbüchel (University of Munster, Institut fur Mikrobiologie, Corrensstrasse 3, D-48149, Munster, Germany). PHB from Biomer Inc. (Forst-Karsten-Strasse 15, D-82152, Krailing, Germany), referenced 16M, was used for scale-up experiments.

Nuclear magnetic resonance (NMR)

$^1$H-NMR spectra were recorded on a Varian Unity 500 MHz. The samples were dissolved in $CDCl_3$.

Gel Permeation Chromatography (GPC)

GPC experiments were performed with a Waters GPC system using chloroform as eluent at 1 mL/min and a Hewlett-Packard HP 1047A refractive index detector. Polystyrene standards were used to calibrate the columns.

Fast atom bombardment mass spectrometry (FAB+- MS)

FAB+-MS experiments were performed on a double focusing high resolution Kratos MS25RFA mass spectrometer equipped with a standard FAB11NF field FAB source. The bombarding gas was Xenon, with an energy of 8 kV, and a beam current of around 1 mA. Spectra were obtained with a metabenzene alcohol as a matrix, and with a doping of sodium chloride NaCl.

Thermal Degradation

Lab-scale experiments were performed using the following procedure: thermal degradation was carried out at a temperature of: 190 ±1° C. and three reaction times, 3.5, 5 and 7 hrs using 1.0 g of polymer in a cylindrical 19mL-reactor. The "as received" polymer was dried under vacuum for 2 hrs and under nitrogen flow for 20 min, which continued throughout the reaction. The glass reactor was heated for the chosen time in a silicone oil bath at constant temperature. The melt viscosity fell to a malleable level in 15–20 mins. The reactor was removed from the oil bath after the chosen reaction time and cooled under nitrogen flow for 20 mins. After standing overnight, the solid was collected, ground to a powder, then analyzed for molecular weight by GPC, proton NMR in deuterated chloroform. FAB$^+$-MS experiments were performed on samples of macromers derived from the homopolymers PHB and PHV. Scale-up experiments were performed using the following procedure: 40 g of starting material were loaded to a heated Brabender instrument (C. W. Brabender Instruments Inc., So. Hackensack N.J., Plasti-corder) having twin counter-rotating pallets. The polymer was heated under mechanical stirring for a chosen reaction time and temperature (±2° C.). Then the stirring was stopped, and the instrument was cooled by compressed air to 50° C. The instrument was opened and the product, still liquid, was collected and allowed to solidify to a brown solid on Aluminum sheets previously placed under the instrument.

Extraction

Occasionally, to the cooled powder was added 25 mL of acetone or hexanes (to dissolve the very low molecular weight oligomers). The polymer was then mixed for 24 hrs under vigorous magnetic stirring. The suspension was centrifuged for 5 min on an International Clinical Centrifuge from IEC (International Equipment Co.). Yields obtained for the copolymers PHB/20 mol % of V and PHB/21 mol % of V are shown on Table 1.

by extraction, thus 25 mL of hexanes were used instead. Differences in solubility in acetone and hexanes have also to be taken into account.

NMR and FAB$^+$-MS experiments showed that the macromers have a carboxylic acid end group at one end and predominantly an unsaturated end group at the other end, either propenyl or butenyl: propenyl for PHB and butenyl for PHV. NMR experiments did not detect the specific peak corresponding to the protons of the hydroxyl end groups, as well as mass spectrometry did not display any evidence of macromers bearing a hydroxyl end group instead of the unsaturated end. NMR spectra showed that the trans configuration of the double bond was predominant; ~95% trans. Indeed, the degradation occurs via a six-membered ring transition state, which sterically disfavors the cis configuration.[8]

Solubility of the samples in acetone depends on the copolymer composition. Indeed, for valerate contents higher than 20%, the thermally degraded copolymer was completely soluble in acetone, hence could not be fractionated by extraction, thus 25 mL of hexanes were used instead. Differences in solubility in acetone and hexanes have also to be taken into account.

The macromers produced have a carboxylic acid end group at one end and either a propenyl or butenyl end group at the other end. NMR experiments did not detect the specific peaks corresponding to the protons of the butenyl end groups, thus the unsaturated sites appear to be predominantly the propenyl ends. The trans configuration of the double bond was found to be predominant; ~95% trans. Indeed, the degradation occurs via a six-membered ring transition state which sterically disfavors the cis configuration.[8]

TABLE 1

Yields obtained from the thermal degradation on copolymers of PHB/V at different mol % of V.

| | Yield | |
|---|---|---|
| Mol % of V in PHB/V | Temperature = 190–192° C. | Temperature = 200–202° C. |
| 20 | 90.7 | 84.1 |
| 21 | 92.0 | 91.3 |

Results

Solubility of the samples in acetone depends on the copolymer composition. Indeed, for valerate contents higher than 20%, the thermally degraded copolymer was completely soluble in acetone, hence could not be fractionated Temperature Effect The degree of polymerization (DP) and the number-average molecular weight ($M_n$) were calculated from $^1$H-NMR spectra. They are shown for the copolymers PHB/20 mol % of V and PHB/21 mol % of V on Table 2.

TABLE 2

Degree of polymerization (DP) and number-average molecular weight (Mn) of copolymers of PHB/V obtained from the thermal degradation and measured by $^1$H-NMR.

| | Temperature = 190–192° C. | | Temperature = 200–202° C. | |
|---|---|---|---|---|
| Mol % of V in PHB/V | DP | $M_n$[a] | DP | $M_n$[a] |
| 20 | 66.5 | 5910 | 26.2 | 2329 |
| 21 | 78.6 | 7090 | 42.6 | 3843 |

Results show that an increase of the reaction temperature increases the degradation rate yielding shorter chain lengths for a given reaction time.

Reaction Time Effect

The trend in the molecular weight with reaction time is shown in FIG. 1. The number average molecular weights decrease significantly with the reaction time.

Copolymer Composition Effect

The average molecular weights of the macromer products from PHB/V do not vary regularly with the copolymer composition. Since, the co-repeat units differ only by a methylene group in the side chain, which does not cause a significant change in the side chain induction effect, morphology differences are the more likely cause.

Conclusion

The macromers of the invention have a carboxylic acid end and a predominantly unsaturated end on each chain, the latter being predominantly a trans-propenyl group.

The reaction temperature and the reaction time affect significantly the average molecular weight of the produced macromers. The copolymer composition effect is non-regular.

Scale-up studies allow the production of important quantities of PHB macromers. The reaction can be performed in a batch process in equipment like a Brabender instrument, or in a continuous process, using an extruder; in particular ten-times scale-up experiments on a Brabender instrument were successful.

We claim:

1. A macromer derived from thermal degradation of poly(3-hydroxybutyrate), poly(3-hydroxyvalerate), or poly(3-hydroxybutyrate-co-3-hydroxyvalerate) and having first and second end groups, said first end group being a propenyl group or a butenyl group and said second end group being a carboxylic acid group, said macromer having a number average molecular weight of 1000 to 6000 g/mol.

2. A macromer according to claim 1, wherein said first end group is said propenyl end group.

3. A macromer according to claim 1, represented by formula:

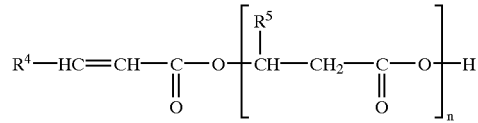

wherein n is an integer indicating the number of repeating units and $R^4$ and $R^5$ are each selected from methyl or ethyl.

4. A macromer according to claim 3 wherein $R^4$ and $R^5$ are both methyl, derived from thermal degradation of poly(3-hydroxybutyrate).

5. A macromer according to claim 3 wherein $R^4$ and $R^5$ ethyl, derived from thermal degradation of poly(3-hydroxyvalerate).

6. A process of producing a macromer comprising thermally degrading poly(3-hydroxybutyrate), poly(3-hydroxyvalerate) or poly(3- hydroxybutyrate-co-3-hydroxyvalerate) and recovering a macromer having first and second end groups, said first end group being a propenyl group or a butenyl group and said second end group being a carboxylic acid group, said macromer having a number average molecular weight of 1000 to 6000 g/mol.

7. A batch process according to claim 6.

8. A continuous process according to claim 6.

9. A process according to claim 6 wherein the degrading is in the range of temperature of 180–220° C.

10. A process according to claim 6 wherein the degrading is at a temperature of 200–202° C.

11. A process according to claim 6 wherein the degrading is at a temperature of 190–192° C.

12. A homopolymer of a macromer of claim 1.

13. A copolymer of a macromer of claim 1, and a comonomer.

14. A block copolymer of a macromer of claim 1, and a block comonomer.

15. A macromer according to claim 3, derived from thermal degradation of poly(3-hydroxybutyrate-co-3-hydroxyvalerate), in which $R^4$ is methyl or ethyl, and in some of said repeating units $R^5$ is methyl, and in the remainder of said repeating units $R^5$ is ethyl.

16. A macromer derived from thermal degradation of a poly(3- hydroxyalkanoate) represented by formula:

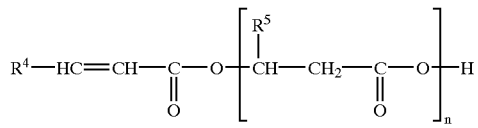

wherein n is an integer indicating the number of repeating units and each R is lower alkyl of 1 to 5 carbon atoms; said macromer having a number average molecular weight of 1000 to 6000 g/mol.

* * * * *